US009266305B2

(12) United States Patent
Maziers

(10) Patent No.: US 9,266,305 B2
(45) Date of Patent: *Feb. 23, 2016

(54) LEISURE ARTICLES AND CARS PREPARED BY MULTILAYER ROTATIONAL MOULDING

(75) Inventor: Eric Maziers, Seneffe (BE)

(73) Assignee: TOTAL RESEARCH & TECHNOLOGY FELUY, Seneffe (Feluy) (BE)

(*) Notice: Subject to any disclaimer, the term of this patent is extended or adjusted under 35 U.S.C. 154(b) by 438 days.

This patent is subject to a terminal disclaimer.

(21) Appl. No.: 12/988,807

(22) PCT Filed: Apr. 21, 2009

(86) PCT No.: PCT/EP2009/054761
§ 371 (c)(1),
(2), (4) Date: Jan. 10, 2011

(87) PCT Pub. No.: WO2009/130228
PCT Pub. Date: Oct. 29, 2009

(65) Prior Publication Data
US 2011/0111151 A1 May 12, 2011

(30) Foreign Application Priority Data

Apr. 21, 2008 (EP) ................................. 08154874
May 21, 2008 (EP) ................................. 08156617
Apr. 21, 2009 (EP) ................................. 09158405

(51) Int. Cl.
B32B 27/32 (2006.01)
B32B 5/20 (2006.01)
(Continued)

(52) U.S. Cl.
CPC ... *B32B 5/20* (2013.01); *B32B 1/02* (2013.01); *B32B 27/065* (2013.01); *B32B 27/18* (2013.01); *B32B 27/306* (2013.01); *B32B 27/308* (2013.01); *B32B 27/32* (2013.01);
(Continued)

(58) Field of Classification Search
CPC .......... B32B 1/02; B32B 27/32; B29C 41/04; Y10T 428/1376
USPC ................................................ 428/36.5, 35.7
See application file for complete search history.

(56) References Cited

U.S. PATENT DOCUMENTS 5,457,159 A    10/1995   Fassina et al.
5,589,519 A *  12/1996   Knaus .............................. 521/60
(Continued)

FOREIGN PATENT DOCUMENTS

EP    0160298 A2    11/1985
EP    1357135 A1    10/2003
(Continued)

OTHER PUBLICATIONS

Annechini D. et al., "Some New Results on Rotational Molding of Metallocene Polyethylenes" Jan. 1, 2001; Society of Plastics Engineers. Annual Technical Conference (Antec). Proceedings, Society of Plastics Engineers, US—vol. 1, pp. 1-5.
(Continued)

*Primary Examiner* — Erik Kashnikow

(57) ABSTRACT

This invention relates to the field of multilayer articles having reinforced structural properties prepared by rotational molding wherein the external and internal skin layers are prepared from polyethylene resin and the intermediate layer is prepared from foamed polyethylene.

20 Claims, 8 Drawing Sheets

(51) Int. Cl.
*B32B 27/06* (2006.01)
*B32B 27/18* (2006.01)
*B32B 27/30* (2006.01)
*B32B 27/34* (2006.01)
*B32B 1/02* (2006.01)

(52) U.S. Cl.
CPC .............. *B32B 27/327* (2013.01); *B32B 27/34* (2013.01); *B32B 2266/02* (2013.01); *B32B 2266/025* (2013.01); *B32B 2266/0242* (2013.01); *B32B 2270/00* (2013.01); *B32B 2307/102* (2013.01); *B32B 2307/30* (2013.01); *B32B 2307/304* (2013.01); *B32B 2307/50* (2013.01); *B32B 2307/54* (2013.01); *B32B 2307/546* (2013.01); *B32B 2307/558* (2013.01); *B32B 2307/72* (2013.01); *B32B 2307/7242* (2013.01); *B32B 2307/7265* (2013.01); *B32B 2307/734* (2013.01); *B32B 2323/04* (2013.01); *B32B 2439/00* (2013.01); *B32B 2605/003* (2013.01); *B32B 2605/08* (2013.01); *B32B 2605/12* (2013.01); *Y10T 428/1376* (2015.01)

(56) References Cited

U.S. PATENT DOCUMENTS

| | | | |
|---|---|---|---|
| 5,783,611 A | 7/1998 | Strebel | |
| 6,124,400 A | 9/2000 | Chien | |
| 2005/0227022 A1* | 10/2005 | Domine et al. | 428/31 |
| 2006/0022365 A1 | 2/2006 | Mazabraud | |

FOREIGN PATENT DOCUMENTS

| | | | | |
|---|---|---|---|---|
| EP | 1422059 A1 | | 5/2004 | |
| EP | 1428841 A1 | | 6/2004 | |
| EP | 1 683 834 | * | 9/2006 | C08I 23/10 |
| EP | 1 736 502 | * | 12/2006 | C08J 5/00 |
| EP | 1736502 A1 | | 12/2006 | |

OTHER PUBLICATIONS

Liu S. J. et al., "Rotational Molding of Two-Layered Polyethylene Foams" Advances in Polymer Technology", Jun. 1, 2001; Wiley and Sons, Hoboken, NJ, US; vol. 20, No. 2; pp. 108-115.

Archer E. et al., "The Rotational Molding Characteristics of Metallocene Polyethylene Skin/Foam Structures"; Journal of Cellular Plastics, vol. 43, Nov. 2007, pp. 491-504.

International Search Report issued in International Application No. PCT/EP2009/054761, dated Oct. 5, 2009 (5 pages).

Andrew J. Peacock, "Handbook of polyethylene", Marcel Dekker, Inc., New York, Jan. 2000.

* cited by examiner

LEISURE ARTICLES AND CARS PREPARED BY MULTILAYER ROTATIONAL MOULDING

This invention relates to the field of multilayer rotomoulded articles having reinforced structural properies.

Polyethylene represents more than 80% of the polymers used in the rotomoulding market. This is due to the outstanding resistance of polyethylene to thermal degradation during processing, to its easy grinding, good flowability, and low temperature impact properties.

Rotomoulding is used for the manufacture of simple to complex, hollow plastic products. It can be used to mould a variety of materials such as polyethylene, polypropylene, polycarbonate polyamide, or polyvinyl chloride (PVC). Linear low density polyethylene is preferably used as disclosed for example in "Some new results on rotational molding of metallocene polyethylenes" by D. Annechini, E. Takacs and J. Vlachopoulos in ANTEC, vol. 1, 2001.

Polyethylenes prepared with a Ziegler-Natta catalyst are generally used in rotomoulding, but metallocene-produced polyethylenes are desirable, because their narrow molecular distribution allows better impact properties and shorter cycle time in processing.

The metallocene-produced polyethylenes of the prior art (see ANTEC, vol. 1, 2001) suffer from high shrinkage and warpage and for some applications from their whiteness in their natural state.

Plastoelastomeric compositions such as described in U.S. Pat. No. 5,457,159 can also be used in rotomoulding, but they require complex processing steps of mixing and vulcanisation.

U.S. Pat. No. 6,124,400 discloses the use for rotomoulding of polymer alloys containing semi-crystalline polyolefin sequences with chains of different controlled microstructure prepared in a "one-pot" polymerisation process from a single monomer. The polymerisation of these polymer alloys requires a complex catalyst system comprising organometallic catalyst precursors, cationic forming cocatalysts and cross-over agents.

It is thus desired to produce articles prepared with two or more layers of similar or dissimilar material in order to improve the final properties of the finished product. It is however generally necessary to add a bonding layer or cross-linking in order to insure structural integrity.

There is thus a need to produce rotomoulded multilayer articles, such as boats, in particular leisure boats, cars, in particular car bodies, structural parts, design parts, or tanks, that do not suffer from these drawbacks.

It is an aim of the present invention to prepare multilayer rotomoulded leisure articles, such as boats, in particular leisure boats, cars, in particular car bodies, structural parts, design parts, or tanks, or cars having good adherence between layers of dissimilar material.

It is also an aim of the present invention to prepare multilayer rotomoulded articles, such as boats, in particular leisure boats, cars, in particular car bodies, structural parts, design parts, or tanks, wherein one of the layer is foamed polyethylene.

It is another aim of the present invention to prepare large multilayer rotomoulded articles, such as boats, in particular leisure boats, cars, in particular car bodies, structural parts, design parts, or tanks, that can be processed easily and quickly.

It is a further aim of the present invention to prepare large multilayer rotomoulded articles, such as boats, in particular leisure boats, cars, in particular car bodies, structural parts, design parts, or tanks, having good stiffness and rigidity.

It is yet another aim of the present invention to prepare large multilayer rotomoulded articles, such as boats, in particular leisure boats, cars, in particular car bodies, structural parts, design parts, or tanks, having controlled wall thickness.

It is also an aim of the present invention to prepare large multilayer rotomoulded articles, such as boats, in particular leisure boats, cars, in particular car bodies, structural parts, design parts, or tanks, having controlled foam thickness.

Any one of these aims is at least partially fulfilled by the present invention.

Figure 1:
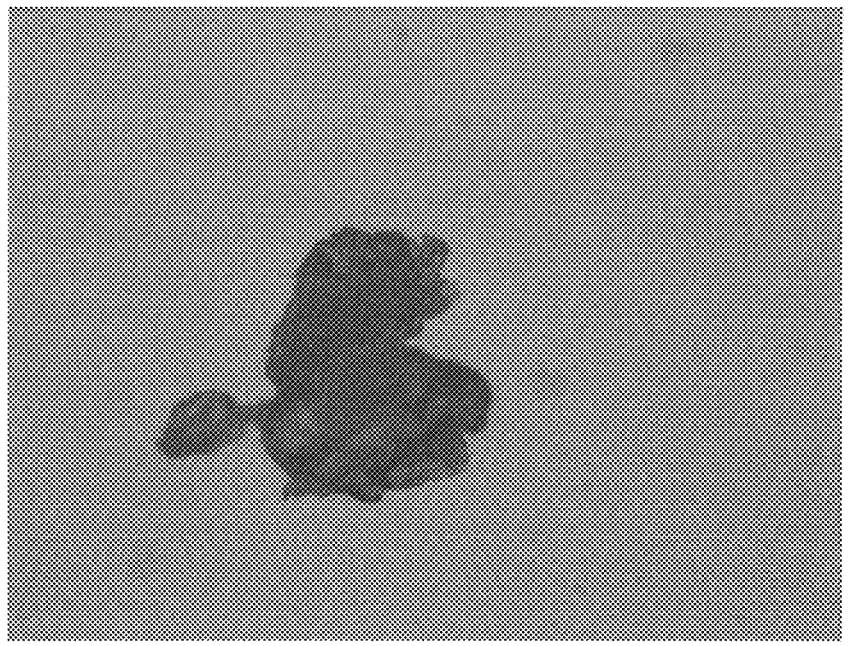
FIG. 1 depicts a powder defined as grains of irregular shape having dimensions of at most 600 µm in accordance with one or more embodiments.

Accordingly, the present invention discloses multilayer rotomoulded articles having reinforced structural properies comprising:

a) an external skin layer that is a polyethylene-based layer prepared from a composition consisting of
    from 40 to 100 wt % of a metallocene-prepared homo- or co-polymer of ethylene or a mixture thereof, based on the weight of skin layer a) composition;
    from 0 to 60 wt % of a functionalised polyolefin (FPO) or of an ionomer or of a polyolefin (PO) grafted to a non-polyolefin (NPO) in the form of a block copolymer (PO)g-NPO), or of a mixture thereof;
b) an intermediate foamed polyethylene layer wherein the polyethylene resin may be the same as or different from that of skin layer a);
c) a internal skin layer that is a polyethylene-based layer prepared from a composition consisting of
    from 40 to 100 wt % of a metallocene-prepared homo- or co-polymer of ethylene or a mixture thereof, based on the weight of skin layer b) composition, said polyethylene or mixture being the same as or different from that of external skin layer a);

from 0 to 60 wt % of a functionalised polyolefin (FPO) or of an ionomer or of a polyolefin (PO) grafted to a non-polyolefin (NPO) in the form of a block copolymer (PO)g-NPO), or of a mixture thereof;

d) optional layers.

Preferably external layer a) is a polyethylene-based layer prepared from a composition consisting of from 40 to 99 wt % of a metallocene-prepared homo- or co-polymer of ethylene or a mixture thereof, based on the weight of skin layer a) composition;

from 1 to 60 wt % of a functionalised polyolefin (FPO) or of an ionomer or of a polyolefin (PO) grafted to a non-polyolefin (NPO) in the form of a block copolymer (PO)g-NPO), or of a mixture thereof;

Additional layers may be added in order to obtain desired properties such as for example barrier properties or good impact at low temperature. These additional layers are preferably prepared from polyamide, polyamide copolymers and/or ethylene vinyl alcohol polymers (EVOH).

Preferably, the external and/or internal skin layers are mixtures, namely blends, preferably dry blends or compounded blends, of metallocene-produced homo- or co-polymers of ethylene.

In a preferred embodiment according to the present invention, the foamed polyethylene layer comprises an ionomer and/or grafted polyolefin, preferably a mixture of both. There is provided multilayer rotomoulded articles comprising:

a) an external skin layer, that is a polyethylene composition, prepared from a blend, preferably a dry blend or compounded blend, of:
  i) from 0 to 100 wt %, based on the weight of external skin layer composition a), of a first polyethylene composition comprising a first metallocene-prepared homo- or co-polymer of ethylene, from 0.1 to 60 wt % of ionomer and grafted polyolefin and from 0 to 60 wt % of functionalised polyolefin (FPO), or polyolefin (PO) grafted to non-polyolefin (NPO) in the form of a block copolymer (PO)g-NPO), or a mixture thereof, preferably said composition being in powder form;
  ii) from 0 to 100 wt %, based on the weight of external skin layer composition a) of a second metallocene-prepared homo- or co-polymer of ethylene having different density and/or melt index than the first metallocene-prepared homo- or co-polymer of ethylene, preferably said composition being in micropellet form b) an intermediate foamed polyethylene layer prepared from
  i) 95 to 99.8 wt % of a polyethylene composition, the same as or different from that of external skin layer a), said composition comprising an ionomer or grafted polyolefin or mixture thereof, and
  ii) from 0.2 to 5 wt % of chemical blowing agent and wherein the ionomer or grafted polyolefin or mixture thereof, blowing agent and metallocene-prepared polyethylene resin have a synergistic effect;

c) an internal skin layer, that is a polyethylene-based layer, prepared from a composition consisting of
  i) from 40 to 100 wt % of a metallocene-prepared homo- or co-polymer of ethylene or a mixture thereof, based on the weight of skin layer b) composition, said polyethylene or mixture being the same as or different from that of external skin layer a);
  ii) and from 0 to 60 wt % of a functionalised polyolefin (FPO) or of an ionomer or of a polyolefin (PO) grafted to a non-polyolefin (NPO) in the form of a block copolymer (PO)g-(NPO), or of a mixture thereof;

d) optional layers.

Preferably, the polyethylene composition b) i) of the intermediate foamed polyethylene layer comprises a mixture of ionomer and grafted polyolefin.

Composition i) of external skin layer a) preferably consists of 40 to 99.9 wt %, based on the weight of composition i), of of a first metallocene-prepared homo- or co-polymer of ethylene, from 0.1 to 60 wt % of ionomer or grafted polyolefin or a mixture thereof and from 0 to 60 wt % of functionalised polyolefin (FPO), or polyolefin (PO) grafted to non-polyolefin (NPO) in the form of a block copolymer (PO)g-NPO), or a mixture thereof.

In yet another preferred embodiment according to the present invention, external skin layer a) is a blend, preferably a dry blend or compounded blend,
  i) from 20 to 99.9 wt %, based on the weight of external skin layer composition a), of a first polyethylene composition preferably comprising from 40 to 99.9 wt %, based on the weight of composition i), of a first metallocene-prepared homo- or co-polymer of ethylene, from 0.1 to 60 wt % of ionomer and grafted polyolefin and from 0 to 60 wt % of functionalised polyolefin (FPO), or polyolefin (PO) grafted to non-polyolefin (NPO) in the form of a block copolymer (PO)g-NPO), or a mixture thereof, preferably said composition being in powder form;
  ii) from 0 to 79.9 wt %, based on the weight of external skin layer composition a) of a second metallocene-prepared homo- or co-polymer of ethylene having different density and/or melt index than the first metallocene-prepared homo- or co-polymer of ethylene, preferably said composition being in micropellet form.

Figure 2:
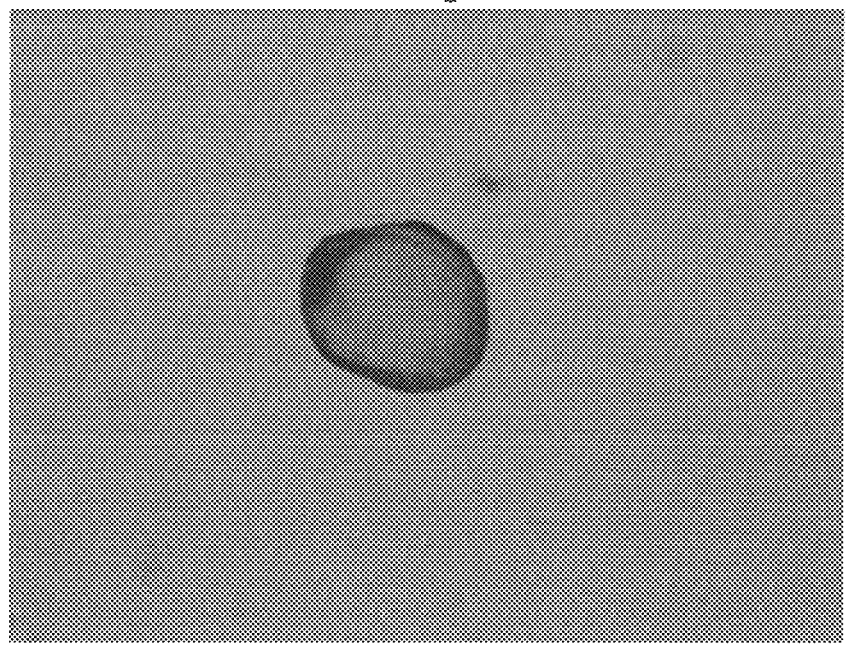
FIG. 2 depicts a micropellet defined as a grain of spherical shape having dimensions of at least 500 µm in accordance with one or more embodiments.

In the present description, a powder is defined as grains of irregular shape and having dimensions of at most 600 μm, shown in FIG. 1. A micropellet is defined as a grain of spherical shape and having dimensions of at least 500 μm, shown in FIG. 2.

Preferably, the polyethylene composition b) i) of the intermediate foamed polyethylene layer comprises a mixture of ionomer and grafted polyolefin.

According to a further embodiment according to the present invention, there is provided multilayer rotomoulded article wherein the polyethylene composition in the external skin layer a) and/or the internal skin layer c) has instead of polyethylene a polyamide and/or a polyamide copolmer and/or ethylene vinyl alcohol, wherein the external a) and internal skin layer c) can be the same or different. The advantages of using polyamide or a copolymer of polyamide instead of metallocene-produced polyethylene, are improved mechanical properties, higher impermeability to hydrocarbons and improved paintability. The paintability is particularly advantageous when the external skin layer is made of polyamide. These same advantages can be obtained by using ethylene vinyl alcohol and in addition the impermeability to gases such as to hydrogen is increased.

External skin layer a) preferably comprises homopolymer (s) or copolymer(s) of ethylene and a grafted polyolefin/functionalised polyethylene and/or ionomer. In this description, copolymers are prepared from one monomer and one or more comonomers.

The polyethylene resin may advantageously be replaced by a blend, preferably a dry blend or a compounded blend of metallocene-prepared polyethylene resins i) and ii) having different properties in order to tailor the properties of the external skin layer.

In external skin layer a), preferably, the second polyethylene resin ii) has a density higher than that of the first polyethylene resin used in composition i). The rotomoulded articles prepared according to the present invention are characterised in that they have low warpage, low sagging, good melt strength and low deformation. They also benefit from improved stiffness and rigidity. The high density resin provides a high Young's modulus in excess of 1000 MPa, whereas the low density resin, that includes ionomers and grafted polyolefins, is responsible for low deformation and low sagging. When the size of the rotomoulded article increases, it is preferable to increase the amount of resin composition i) in skin layer a) in order to minimise sagging and deformation. For example, for articles of the order of 2 m, first composition i) is optional, whereas for structures of the order of 5 m, it is recommended to use about 40 wt %, based on the weight of external skin layer a), of composition i). This is particularly applicable to boats and more particularly to leisure boats.

It is also advantageous to use in external skin layer a) a blend, preferably a dry blend or a compounded blend, of resin composition i) in powder form and of resin ii) in micropellet form in order to have a controlled release of the rotomoulded part from the mould during the rotomoulding process, thereby reducing deformation of the finished article, in particular when resin ii) has a higher density than resin i). Indeed, powder melts faster than micropellets and will thus migrate to the outer part of the skin layer and provides better and more controlled release from the the mould thanks to the ionomer and grafted polyethylene included in said resin.

In a preferred embodiment according to the present invention, the composition of external skin layer a) comprises from 70 to 99.9 wt %, preferably 70 to 99 wt %, based on the weight of skin layer a) composition of the blend of first and second polyethylene resins, more preferably from 80 to 99 wt %, even more preferably 80 to 98 wt % and most preferably from 85 to 98 wt %, and preferably from 0.1 to 30 wt %, more preferably from 1 to 30 wt % even more preferably from 1 to 20 wt % and most preferably from 2 to 15 wt % of ionomer or functionalised polyolefin, in particular grafted polyolefin, or a combination thereof.

The external skin layer composition a) preferably comprises a blend, preferably a dry blend or a compounded blend, of from 20 to 80 wt % of first metallocene produced polyethylene i) and from 20 to 80 wt % of second metallocene produced polyethlene ii), based on the total weight of polyethylenes i) and ii). More preferably it comprises from 40 to 60 wt % of first metallocene produced polyethlene i) and from 40 to 60 wt % of second metallocene produced polyethylene ii).

Preferably, the composition of internal skin layer b) comprises from 90 to 100 wt %, based on the weight of skin layer b) composition and more preferably about 100 wt % of polyethylene, and preferably from 0 to 10 wt % and more preferably 0 wt % of functionalised polyethylene or ionomer.

The functionalised polyolefins, if present are polyolefins grafted with a material that provides polarity and/or reactivity and they therefore depend upon the nature of the adjacent layers. Preferably in the present invention, the polyolefins are grafted with anhydride and preferably, the polyolefin is polyethylene or polypropylene, more preferably, it is polyethylene. Alternatively, the functionalised polyolefin is an ionomer. Grafted polyethylene provides excellent adhesion properties between the layers and controlled release from the mould whereas ionomers enhance mechanical properties. In a more preferred embodiment according to the present invention, the functionalised polyolefin is a mixture of ionomer and grafted polyethylene.

An ionomer is a polyelectrolyte that comprises copolymers containing both electrically neutral repeating units and a fraction of ionised units, usualy representing at most 15 percent of the polymer. They link in such a way that, even though they are stiff at room temperature, the bonds may be broken down thermally and the new linkages will cause the material to act as though it were a thermoplastic material. The ionic attractions that result strongly influence the polymer properties, especially its mechanical properties.

In an ionomer, the non-polar chains are grouped together and the polar ionic groups are attracted to each other. This allows thermoplastic ionomers to act in ways similar to that of cross-linked polymers or block copolymers, but in fact they are called reversible cross-linkers. When heated, the ionic groups lose their attractions for each other and the chains become mobile. The chains motion increases with increasing temperature and the groups can no longer stay in their clusters. This produces a polymer that has the properties of an elastomer and the processability of a thermoplastic.

Suitable ionomers can for example be selected from poly (ethylene-co-methacrylic acid). This polymer is a sodium or zinc salt of copolymers derived from ethylene and methacrylic acid.

Grafted polyethylene provides excellent adhesion properties between the layers and controlled release from the mould whereas ionomers enhance mechanical properties. Thus the larger the article, the more important the presence of ionomer.

The preferred polyethylene in a) i) and/or a) ii) and/or c) i) and/or c) ii) according to the present invention is a homo- or co-polymer of ethylene produced with a catalyst comprising a metallocene on a silica/aluminoxane support. The polyethylene may be the same or different in each of the layers. More preferably, the metallocene component is ethylene-bis-tetrahydroindenyl zirconium dichloride or dimethylsilylene-bis (2-methyl-4-phenyl-indenyl)zirconium dichloride. The most preferred metallocene component is ethylene-bis-tetrahydroindenyl zirconium dichloride.

The melt index of the polyethylene resin in a) i) preferably used in the present invention is typically at least equal to 0.5 dg/min, preferably of at least 1 dg/min. It is preferably at most equal to 25 dg/min, preferably of at most 20 dg/min. The melt flow index MI2 is measured following the method of standard test ASTM D 1283 at a temperature of 190° C. and a load of 2.16 kg.

The melt index of the second polyethylene resin a) ii) preferably used in the present invention is of at least 1 dg/min, preferably of at least 5 dg/min. It is preferably of at most 30 dg/min, more preferably of at most 25 dg/min.

The homo- and co-polymers of ethylene in a) i) that can be used in the present invention preferably have a density of at least 0.920 g/cc, preferably of at least 0.930 g/cc. It is of at most 0.965 g/cc, preferably of at most 0.960 g/cc. The density is measured following the method of standard test ASTM D 1505 at 23° C.

The density of the second polyethylene resin a) ii) preferably used in the present invention is of at least 0.930 g/cc, preferably of at least 0.935 g/cc. It is preferably of at most 0.968 g/cc, more preferably of at most 0.965 g/cc.

The polyethylene(s) of internal skin layer c) can have densities and melt indices as provided for those of external skin layer a) i).

The polyethylene of the present invention may also have a bi- or multimodal molecular weight distribution, i.e. they may be a blend of two or more polyethylenes with different molecular weight distributions, which can be blended either physically or chemically, i.e. produced sequentially in two or more reactors. If the blends are physical blends, they may also be compounded in an extruder.

The polydispersity D of the polyethylene suitable for the present invention is in the range 2 to 20, preferably 2 to 15, more preferably less than or equal to 10, and most preferably less than or equal to 6, the latter range being typically associated with the preferred metallocene-prepared polyethylene resins. The polydispersity index D is defined as the ratio Mw/Mn of the weight average molecular weight Mw over the number average molecular weight Mn.

The resins of the present invention may also comprise other additives such as for example antioxidants, acid scavengers, antistatic additives, fillers, slip additives or anti-blocking additives, processing aid.

The foamed polyethylene layer is prepared by standard techniques with chemical blowing agents. In a preferred embodiment, it includes one or more ionomers. In a more preferred embodiment, it includes both one or more ionomers and one or more grafter polyolefin, preferably a grafted polyethylene. It has been surprisingly observed that the combined use of metallocene-produced polyethylene including an ionomer and the grafted polyethylene with the blowing agent produces a very homogeneous and regular foam.

The composition may be prepared by extruding the polyolefin either with a masterbatch comprising the foaming agent or directly with the foaming agent. Alternatively, and preferably, the polyethylene particles are dry blended with the chemical blowing agent and introduced directly into the mould during the rotomoulding cycle.

In order to foam polyethylene a blowing agent must fulfill several requirements:
  the decomposition temperature of the blowing agent is compatible with the processing temperature of the polymer;
  the liberation of the blowing gas occurs within a defined temperature range of about 10° C. and is controllable during the process;
  the decomposition is not autocatalysed in order to avoid overheating;
  the blowing gas is chemically inert, such as preferably nitrogen, carbon dioxide and water;
  the chemical blowing agent is homogeneously and easily incorporated in and compatible with polyethylene.

During foaming process, at elevated temperatures, chemical blowing agents undergo chemical reactions, mostly decomposition, that liberate the blowing gas, typically $N_2$, CO, $CO_2$, $NH_3$ and water.

The chemical agents that can be used in the present invention can function according to three main processes:
  a) Irreversible reaction: AB→C+gas. They can be selected from the group consisting of azo compounds, hydrazine derivatives, semicarbazides, tetrazoles and nitroso compounds.
  b) Equilibrium reactions: AB<→C+gas. They can be selected from the group consisting of bicarbonates and carbonates.
  c) Combination of compounds that liberate gasses as a result of their chemical interactions: A+BG→AB+gas.

The blowing agents can be:
  exothermic such as for example azodicarbonamide (AZ) or 4,4'-oxy-bis(benzenesulfonylhydrazide) (OB); or
  endothermic such as for example sodium bicarbonate (SB).

Azo compounds such as for example azodicarbonamide decompose at a temperature of from 160 to 215° C. and liberate about 220 ml/g of gas, mostly $N_2$, CO, $CO_2$, $NH_3$ and water.

Hydrazides such as for example or 4,4'-oxy-bis(benzenesulfonylhydrazide). It decomposes at a temperature of from 140 to 160° C. and liberates 120 to 140 ml/g of gas, mostly $N_2$ and $H_2O$. This type of agent is particularly preferred as it is exothermic and releases only neutral gases.

Carbonates such as for example $NaHCO_3$ in combination with citric acid. It decomposes at a temperature of from 150 to 230° C. and liberates 140 to 230 ml/g of gas, mostly $CO_2$ and $H_2O$.

The amount of blowing agent is of at least 0.2 wt % based on the total weight of the foamed polyethylene composition of the intermediate layer, preferably of at least 1 wt %. It is of at most 5 wt %, preferably of at most 3 wt %. The most preferred amount is of about 2.5 wt %.

The exothermic agents have a much higher decomposition rate than the endothermic agents.

Multiple layers object can be prepared either by manual introduction of material during the moulding cycle, or by the use of a drop-box, or by a one-shot system.

Manual addition involves moving the mould from the oven, removing a vent tube or plug that creates an opening in the part and adding more material using a fennel or wand. This operation must be repeated for each additional layer.

A drop-box typically contains a single material layer and it is an insulated container that holds material until it is released at the appropriate time during the cycle. The signal for release of material is usually transmitted as a pressure pulse via the airline through the arm of the machine. The insulation must be kept cool to prevent the material inside the box from melting.

In either method, there are two critical factors:
  the temperature at which the subsequent layer is added: it is critical for determining the wall thickness of the previous skin formed and how well the two layers may be bound together;
  the time elapsed before addition of the subsequent layer of material: if the mould is at rest for too long, material that has already adhered to the wall may sag.

It is possible to reduce these problems by lowering the melt index of the first layer and/or by reducing the injection temperature of the next layer, and/or by cooling the mould slightly before injection or the next layer.

The cycle time necessary to produce multilayer rotomoulded articles depends upon the number of layers and upon the mass injected for each layer.

The present invention also discloses a method for preparing multilayer articles that comprises the steps of:
  a) feeding the composition of external skin layer a) as a dry blend into a mould;
  b) placing the filled mould in pre-heated oven;
  c) rotating the filled mould about two perpendicular axes;
  d) feeding the the composition of the foamed intermediate layer as a dry blend of polethylene composition and chemical blowing agent;
  e) repeat steps b) and c);
  f) feeding the composition of internal skin layer c);
  g) repeat steps b) and c);
  h) optionally feeding desired additional layers.

Alternatively, the chemical blowing agent can be introduced during the rotomoulding cycle by a teflon tube.

The first key point in the process is the time at which the temperature inside the mould reaches the melting temperature of the external polyethylene skin layer. The intermediate layer comprising polyethylene and foaming agent is injected as soon as or just before that first melting temperature is reached.

The second key point in the process is the time at which the temperature inside the mould reaches the melting temperature of the polyethylene/foaming agent composition. The internal polyethylene skin layer is injected as soon as or just before that second melting temperature is reached.

Preferably, the intermediate layer comprising polyethylene and foaming agent is injected between 4 and 7 minutes before the first melting temperature is reached.

Preferably, the internal polyethylene skin layer is injected between 10 and 20 minutes before the second melting temperature is reached.

Typically, the oven temperature is of from 280 to 300° C. The temperature inside the mould must be compatible with the foaming temperature and is preferably of the order of 160° C.

The mould is typically cooled by cold air.

This invention is particularly suitable for preparing articles that demand stiff and rigid walls such as for example boats, in particular leisure boats and kayaks, of from 2 to 24 m, preferably from 4 to 15 m long, more preferably from 4 to 10 m, or the body of small to medium size cars, preferably car bodies, or tanks, in particular tanks for over- or underground, such as for example large fuel or water tanks, or structural parts such as for example furniture, or design parts such as for example dashboards in cars. The intermediate layer prepared with foamed polyethylene allows the preparation of thick-walled, light-weight articles. The finished articles are characterised by high impact resistance and good thermal and sound insulation. In addition, they keep sufficient elasticity to resist fracture under shock, contrary to equivalent articles prepared from polystyrene or polyester. They are also characterised by low sagging, low warpage and low deformation. This latter point is very important for leisure boats because their maximum speed is adversely affected by deformation.

The thickness of each layer is determined by the size of the final product, by the desired properties and by the cost: it can vary from 0.5 mm up to several cm. In the present invention directed primarily to leisure boats, kayaks and cars' bodies, technical and structural parts and design parts, the external skin layer has a thickess of from 1 mm to 50 mm, preferably, up to 30 mm, more preferably up to 20 mm, the intermediate foamed layer has a thickness of a from 3 to 200 mm, preferably up to 150 mm, more preferably of up to 100 mm, most preferably up to 50, and the internal skin layer has a thickness of from 0.5 to 2.5 mm. The thicker the desired foam, the more blowing agent required.

The resulting articles are characterised by an excellent stiffness and rigidity.

In particular, the following is preferred for boats:

A boat of less than 2 m in length, preferably comprises a first metallocene-produced polyethylene as the external skin layer, wherein the intermediate foamed layer comprises a foamed second metallocene-produced polyethylene having lower melt index than the first, further comprising chemical blowing agent, ionomer and/or grafted polyolefin. The thicker the desired foamed layer, the more chemical blowing agent that must be added. The internal skin layer can be the same as or different from the external layer.

A boat of 2 to 5 m in length, preferably comprises as the external skin layer a first metallocene-produced polyethylene, or more preferably a blend of a first metallocene-produced polyethylene, preferably having a higher density than the second, and preferably in the shape of micropellets, and a second metallocene-produced polyethylene. The second metallocene-produced polyethylene is preferably the same as the polyethylene of the intermediate foamed layer and preferably in the shape of a powder. The internal skin layer can be the same or different. The intermediate foamed layer preferably comprises a foamed metallocene-produced polyethylene having a lower melt index than the first polyethylene of the external layer, further comprising chemical blowing agent, ionomer and/or grafted polyolefin, preferably both ionomer and grafted polyolefin. The thicker the desired foamed layer, the more chemical blowing agent that must be added.

A boat greater than 5 m in length, preferably comprises as the external skin layer preferably a blend of a first metallocene-produced polyethylene, preferably having a higher density than the second, and preferably in the shape of micropellets, and a second metallocene-produced polyethylene. The second metallocene-produced polyethylene is preferably the same as the polyethylene of the intermediate foamed layer and preferably in the shape of a powder. The internal skin layer can be the same as or different from the external layer. The intermediate foamed layer preferably comprises a foamed metallocene-produced polyethylene having a lower melt index than the first polyethylene of the external skin layer, further comprising chemical blowing agent, ionomer and/or grafted polyolefin, preferably both ionomer and grafted polyolefin. The thicker the desired foamed layer, the more chemical blowing agent that must be added.

The articles of the present invention are also completely recyclable: they can be reground and used in other applications.

EXAMPLES

Example 1

A three layer rotomoulded article was prepared as follows.
the internal skin layer was prepared with a metallocene-produced polyethylene sold by Total Petrochemicals under the name M3583 UV®. It has a density of 0.934 g/cc and a melt index MI2 of 8 dg/min.
the intermediate foamed polyethylene layer was prepared from a composition of 97.5 wt % of a metallocene-prepared polyethylene resin, comprising functionalised polyolefin and ionomer, sold by Total Petrochemicals under the name M3670® and 2.5 wt % of chemical blowing agent sold by Lanxess Distribution GmbH under the name Genitron OB®.
the external skin layer was prepared from a composition of 50 wt % of M3583 UV® and 50 wt % of M3670®.

The finished rotomoulded article ad an internal skin layer of 1 to 2 mm, an intermediate foamed layer of 10 to 12 mm and an external skin layer of 2 to 4 mm.

It must be noted that M3670® is a powder composition that includes 1 wt % ionomer Surlyn® from Dupont and 5 wt % grafted polyethylene Bynel® and black pigment also sold by Dupont having a density of 0.939 g/cm3 and a melt index MI2 of 3.5 g/10 min.

Example 2

Increased Dimensional Stability

During the rotomoulding cooling step, due to the lower density of polyethylene in the melt (about 0.720 g/cm3) than in the semi-crystalline solid state, the rotomoulding article shrinks. This effect also helps the release of the article from the mould. However, shrinking must occur regularly and uniform throughout the structure in order to respect the shape of the moulded article i.e. the resin must show a high dimensional stability and little warpage. The following shows the effect of the intermediary foamed layer (b) according to the invention having improved dimensional stability over foamed layers according to the prior art.

Figure 3A:
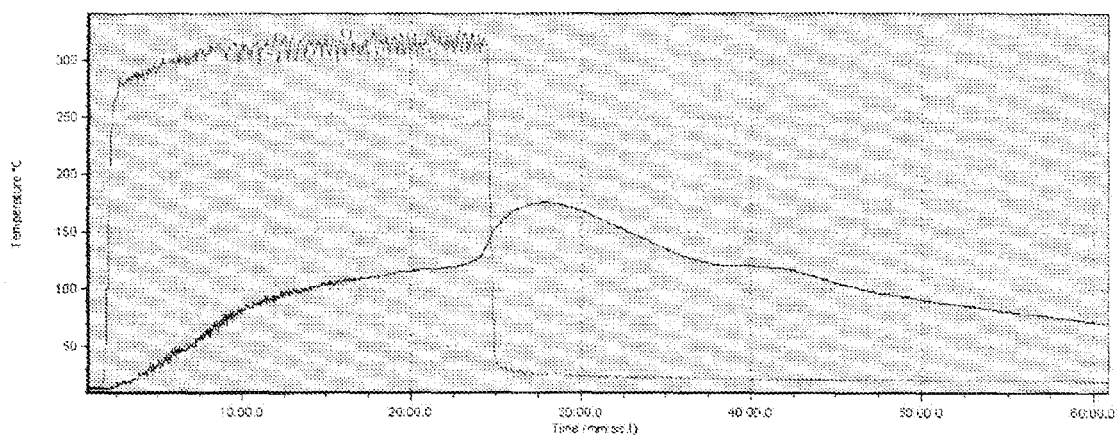
FIG. 3a depicts a moulding cycle with a PIAT of 175.6° C. in accordance with one or more embodiments.
Figure 3B:
FIG. 3b depicts a container in accordance with one or more embodiments.

Container A having a single foamed layer was rotomoulded using a metallocene polyethylene resin M4043UV® having a density of 0.940 g/cm3 and a melt index MI2 of 4 g/10 min, 3 wt % of a chemical blowing agent (Genitron OB®) and a release agent Freekote®, according to the prior art. The moulding cycle can be seen in FIG. 3a with a PIAT of 175.6° C. The resulting container can be seen in FIG. 3b. It has a wall thickness of about 20-25 mm thick and a highly irregular structure, suffering from a lack of dimensional stability and a high amount of warpage.

Figure 4A:
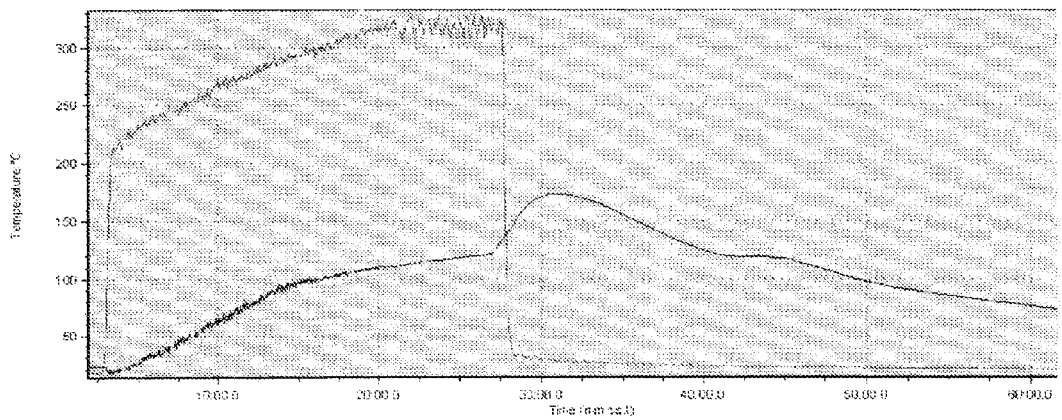
FIG. 4a depicts a moulding cycle with a PIAT of 124° C. in accordance with one or more embodiments.
Figure 4B:
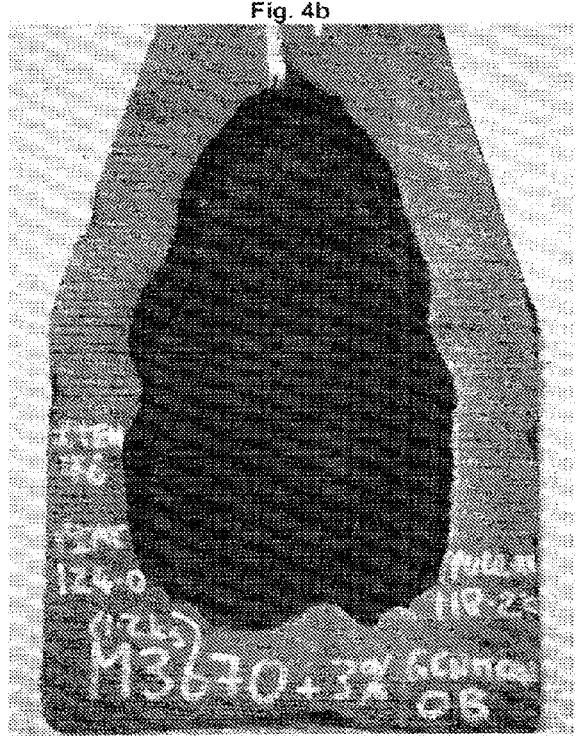
FIG. 4b depicts a container in accordance with one or more embodiments.

Container B was prepared according to the foamed layer (b) of the invention. The single foamed layered container was prepared using a mixture of metallocene-produced polyethylene, namely 50 wt % M4043UV® and 50 wt % M3670® (the latter comprising 1 wt % ionomer Surlyn® from Dupont, 5 wt % grafted polyethylene Bynel® and black pigment), 3 wt % of chemical blowing agent (Genitron OB®). No release agent was used. The moulding cycle can be seen in FIG. 4a with a PIAT of 124° C. The resulting container can be seen in FIG. 4b. It is about 40 mm thick and has a regular structure, showing increased dimensional stability, without the use of any release agent.

This shows that articles which show less deformation and better dimensional stability can be obtained with the foamed layer according to the invention. In addition, better control release from the mould is achieved. As a result articles with thicker foamed layers can be obtained.

Dimensional stability is particularly important for boats, since shape deformations and warpage reduce the maximum speed at which the boat can travel.

Example 3

Reduced Sagging

Sagging occurs during the rotomoulding process of multilayer articles. After injection and rotation of the polyethylene resin to obtain the first layer, the rotation is stopped to cool and to inject the foamed polyethylene of the second layer. However, particularly in the fabrication of large articles, such as boats, particularly leisure boats up to 24 m in length, and in car bodies, the large amounts of melted polyethylene used in the first layer do not have time to cool completely and the melted polyethylene will begin to sag, causing unsightly deformations of the internal surface.

The following containers C, D and E were made in an oven set to 260° C. The second shot for the second layer was made when the mould reached 119° C. The mould was removed to the cooler at 123° C.

Figure 5A:
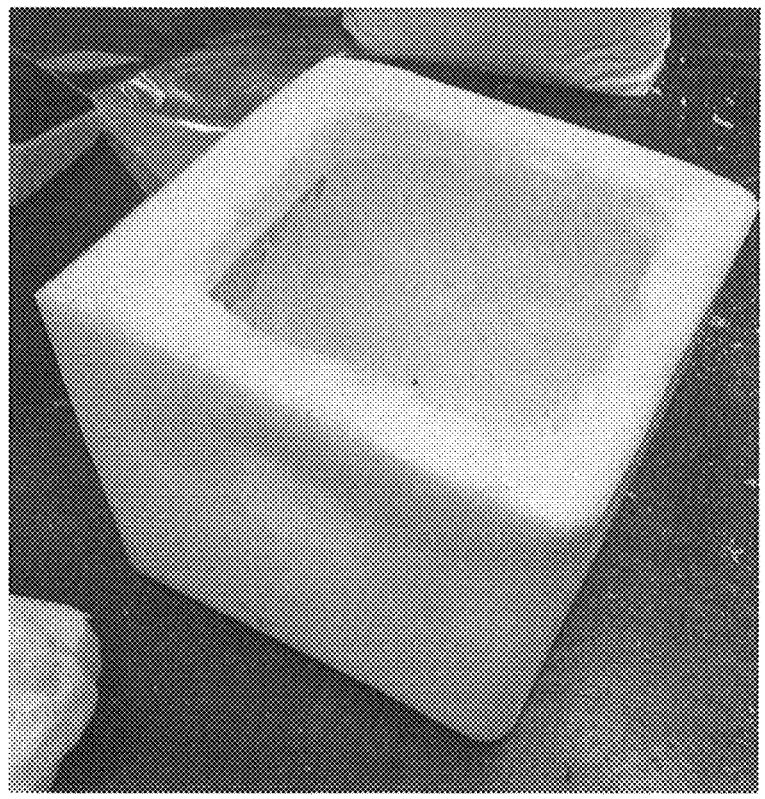
FIGS. 5a and 5b depict a rotomoulded, two layer container made in a mould.
Figure 5B:
Figure 6:
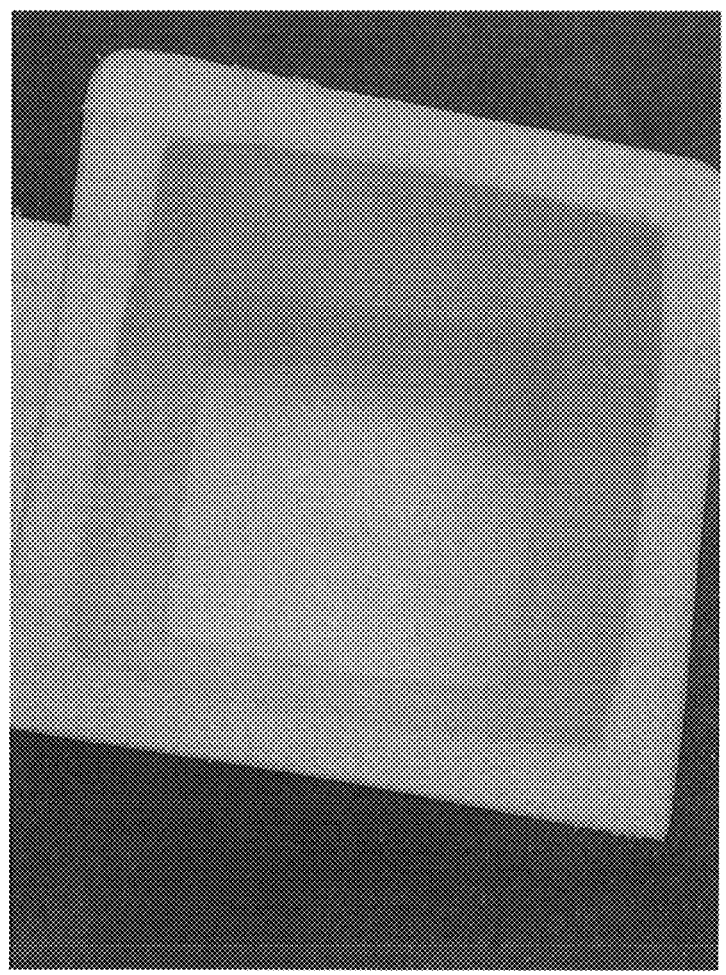
FIG. 6 depicts a rotomoulded, two layer container made in a mould in accordance with one or more embodiments.
Figure 7A:
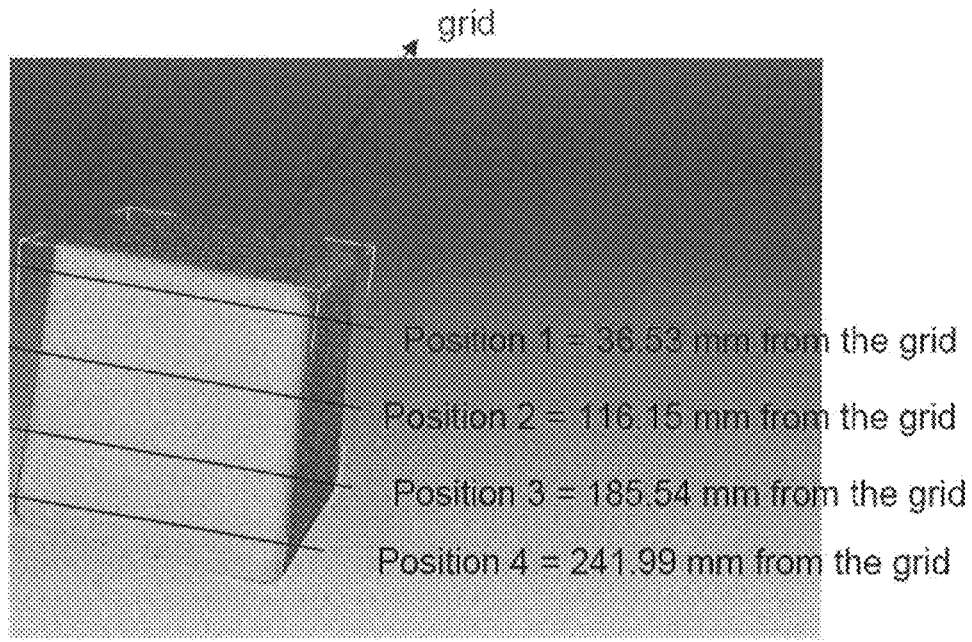
FIG. 7a depicts a container with internal surface measured along a height of the container in a tomography analysis in accordance with one or more embodiments.
Figure 7B:
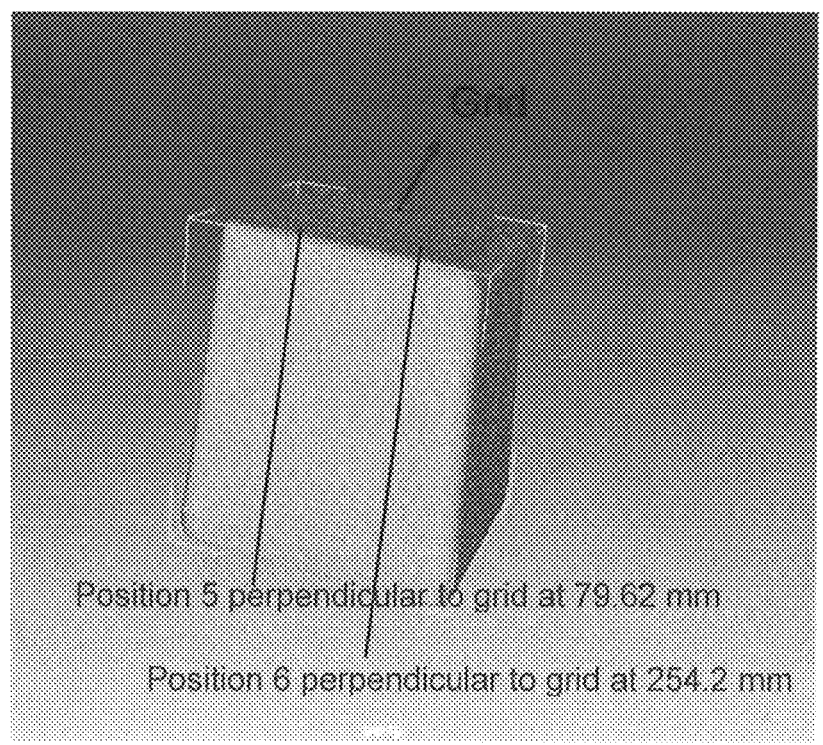
FIG. 7b depicts a container with internal surface measured along a width of the container in a tomography analysis in accordance with one or more embodiments.

Container C (FIGS. 5a and 5b) made in a mould 300 mm×300 mm×300 mm in size was rotomoulded with two layers, according to the prior art:
   a first external layer comprising 900 g of a mixture comprising 50 wt % of M3673® (which comprises 1 wt % ionomer Surlyn® from Dupont, 5 wt % grafted polyethylene Bynel®) and 50 wt % of M4043UV®.
   a second foamed polyethylene layer comprising 1.8 kg of ICO 1-3560 (sold by Borealis under the name RM8343®, a first generation metallocene-produced polyethylene, having a melt index MI2 of 6 g/10 min and a density of 0.934 g/cm$^3$) and 3 wt % Genitron OB® chemical blowing agent Container D made in a mould 300 mm×300 mm×300 mm in size was rotomoulded with two layers, according to the invention:
   a first external layer comprising 900 g of M4043UV®.
   a second foamed polyethylene layer comprising 1.8 kg of M3673® (which comprises 1 wt % ionomer Surlyn® from Dupont, 5 wt % grafted polyethylene Bynel®) and 3 wt % Genitron OB® chemical blowing agent Container E (FIG. 6) made in a mould 300 mm×300 mm×300 mm in size was rotomoulded with two layers, according to the invention:
   a first external layer comprising 900 g of a mixture comprising 50 wt % of M3673® (which comprises 1 wt % ionomer Surlyn® from Dupont, 5 wt % grafted polyethylene Bynel®) and 50 wt % of M4043UV®.
   a second foamed polyethylene layer comprising 1.8 kg of M3673® (which comprises 1 wt % ionomer Surlyn® from Dupont, 5 wt % grafted polyethylene Bynel®) and 3 wt % Genitron OB® chemical blowing agent The internal surface was measured along the height of the container at 4 positions (FIG. 7a: Position 1 at 36.53 mm, Position 2 at 116.15 mm, Position 3 at 185.54 mm and Position 4 at 241.99 from the grid) and along the width of the container at 2 positions (FIG. 7b: Position 5 at 79.62 mm from the side perpendicular to the grid and Position 6 at 254.2 mm from the side perpendicular to the grid) in a tomography analysis to determine the amount of sagging. Table 1 shows the results.

TABLE 1

| Position of surface measurement | Container C | Container D | Container E |
| --- | --- | --- | --- |
| Position 1/mm$^3$ | 18400 | 21287 | 27711 |
| Position 2/mm$^3$ | 12314 | 24131 | 28485 |
| Position 3/mm$^3$ | 11575 | 25833 | 30287 |
| Position 4/mm$^3$ | 36304 | 30420 | 35327 |
| Position 5/mm$^3$ | 29093 | 27662 | 33665 |
| Position 6/mm$^3$ | 30257 | 27181 | 32345 |
| Average/mm$^3$ | 22991 | 26086 | 31303 |
| Standard deviation | 9422 | 2869 | 2730 |

Thus it can be seen that Container C according to the prior art suffers from sagging. The large standard deviation in the surface measurements indicates that the surface is not even. This is also corroborated with the figures. In addition, the average wall thickness is also much smaller.

Containers D and E on the other hand show more even and thicker wall thicknesses and thus less sagging.

Due to the reduced sagging, the invention is particularly suitable for producing very large articles. The ability to increase the wall thickness also allows for the production of larger articles. Hence, the invention can be used to produce articles, such as car bodies and boats, in particular leisure boats, up to 24 m in length.

Example 4

Increased Stability and Increased Adhesion Between the Layers

Figure 8:
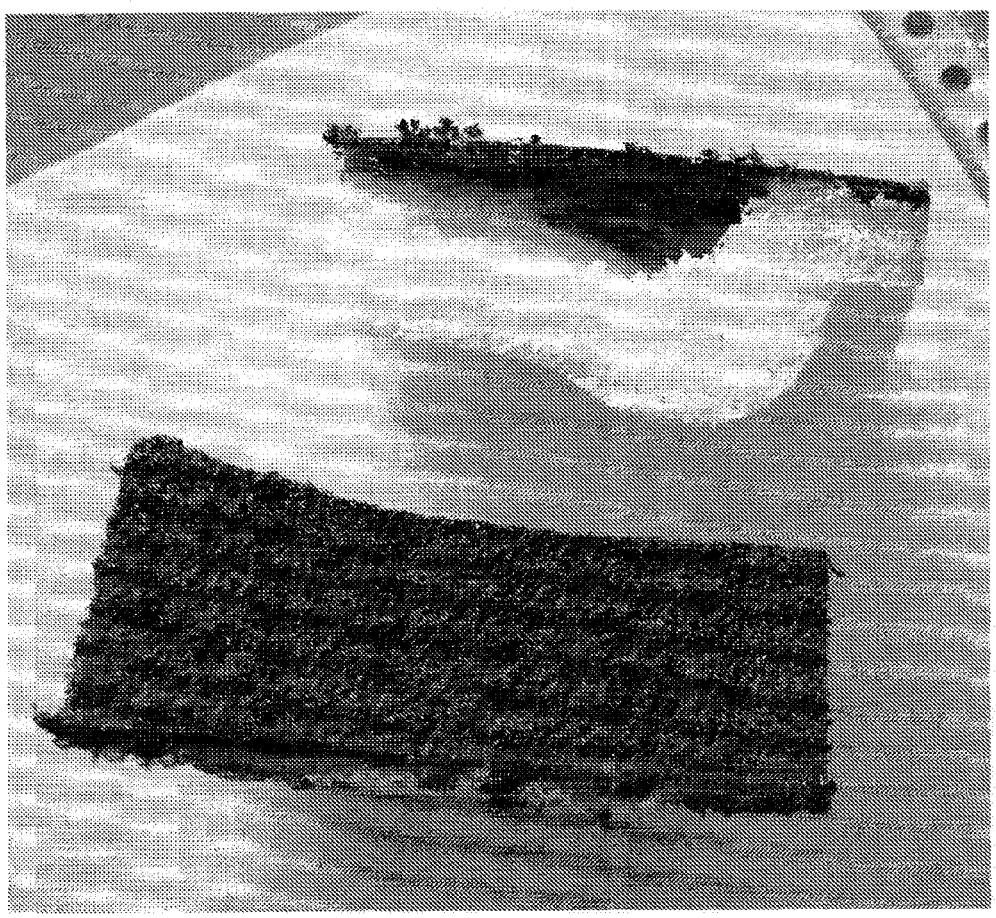
FIG. 8 depicts two 2-layered Samples in accordance with one or more embodiments.

FIG. 8 shows two 2-layered Samples A and B.

Sample A has a white foamed layer made of metallocene-produced M3583UV® having a melt index MI2 of 8 g/10 min and a density of 0.934 g/cm3 and 2.5 wt % of Genitron OB® chemical blowing agent, and a black external layer made of 50 wt % M3670® (which comprises 1 wt % ionomer Surlyn® from Dupont, 5 wt % grafted polyethylene Bynel® and black pigment) and 50 wt % of M4043UV®.

The absence of ionomer and/or grafted polyolefin in the foamed layer causes reduced adhesion to the external layer. The foamed layer is deformed and unstable. Sample B has a black foamed layer made of metallocene-produced M3670UV® (which comprises 1 wt % ionomer Surlyn® from Dupont, 5 wt % grafted polyethylene Bynel® and black pigment) and 2.5 wt % of Genitron OB® chemical blowing agent, and a black external layer identical to that in Sample A.

The presence of ionomer and grafted polyolefin increases the adhesion between the layers and also increases the stability of the foamed layer.

Example 5

Improved Mechanical Properties: Stiffness and Rigidity

Figure 9:
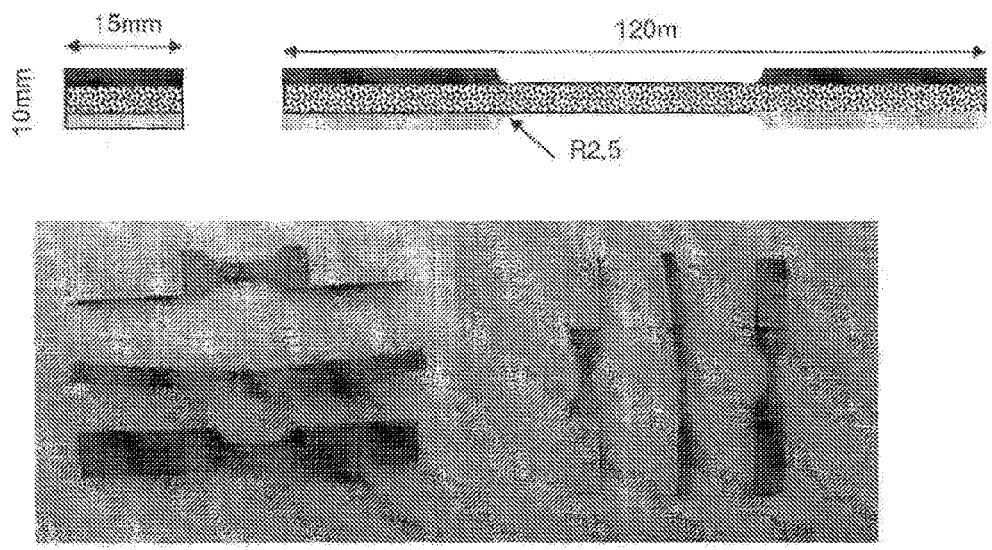
FIG. 9 depicts an article that includes a foamed layer, an external and an internal layer in accordance with one or more embodiments.

The modulus of the 3-layered article can be determine by combining the non-linear viscoelastic properties of each individual layer. In this way, the behaviour law of each layer is taken into account when determining the tensile, flexural and compression moduli. In particular, the tensile modulus of the foamed layer was measured by cutting out the external and internal layers as shown in FIG. 9, thereby exposing the intermediary foamed layer, according to sample type of (modified) ASTM D1822. The measurements were carried out with the VideoTraction® system developed by Company APOLLOR. The VideoTraction® system tracks in real-time the barycentres of markers deposited on the sample surface and pilots the testing machine according to the material's behaviour. The system uses movie camera, image analysis and data acquisition, the whole joined together in a PC.

Tensile tests were carried out at constant local strain rate (between markers) of $10^{-3}$ $s^{-1}$ at 5 temperatures (23, 40, 50, 60, 80° C.). Creep tests were carried out under tension at local constant true stress by measuring 2 to 4 true stresses per temperature at 5 temperatures (23, 40, 50, 60, 80° C.) for 48 hours. Longitudinal and transversal deformations were measured. The true stress was calculated according to the hypothesis of transverse isotropy.

The following samples were measured:
3-Layered Sample C:
external layer a) of 12 wt % and 1.5 mm thickness of 50 wt % M3583® having a density of 0.934 g/cm³ and a melt index MI2 of 8 g/10 min and 50 wt % M3670® which comprises 1 wt % ionomer Surlyn® from Dupont, 5 wt % grafted polyethylene Bynel® and black pigment
foamed layer b) of 80 wt % and 10 mm thickness of M3670UV® which comprises 1 wt % ionomer Surlyn® from Dupont, 5 wt % grafted polyethylene Bynel® and black pigment and 3 wt % Genitron OB® chemical blowing agent
internal layer c) of 8 wt % and 1.0 mm thickness of M3583®
3-Layered Sample D:
external layer a) of 13.8 wt % and 4 mm thickness of 50 wt % M4043® having a density of 0.940 g/cm³ and a melt index MI2 of 4 g/10 min and 50 wt % M3670® which comprises 1 wt % ionomer Surlyn® from Dupont, 5 wt % grafted polyethylene Bynel® and black pigment
foamed layer b) of 79.3 wt % and 23 mm thickness of M3670UV® which comprises 1 wt % ionomer Surlyn® from Dupont, 5 wt % grafted polyethylene Bynel® and black pigment and 3 wt % Genitron OB® chemical blowing agent
internal layer c) of 6.9 wt % and 2.0 mm thickness of M4043®
2-Layered Sample E:
external layer a) of 1.5 mm thickness of M3670UV® which comprises 1 wt % ionomer Surlyn® from Dupont, 5 wt % grafted polyethylene Bynel® and black pigment
foamed layer b) of 24 mm thickness of M3670UV® which comprises 1 wt % ionomer Surlyn® from Dupont, 5 wt % grafted polyethylene Bynel® and black pigment and 3 wt % Genitron OB® chemical blowing agent For the tensile (Young) modulus of the foamed layer alone, the imposed speed of testing was $10^{-3}$ $s^{-1}$ on a sample according to FIG. 9.

For the compression modulus of the foamed layer alone, the imposed speed of testing was 1.2 mm/min. A sample cube of size 15×15×15 mm of the material used in foamed layers b) of Sample C was tested.

The tensile (Young) modulus of the 3-layered samples were measured on a rectangular sample of size 100×20×10 mm according to ISO178. The imposed speeds of testing were $10^{-3}$ $s^{-1}$ and $10^{-2}$ $s^{-1}$. The temperature was maintained between 20 to 24° C. 5 measurements per speed were made and the average taken.

The compression modulus of the 3-layered samples in parallel direction of the 3 layers were measured on a sample cube of size 15×15×10 mm. The imposed speed of testing was 1.2 mm/min.

The flexural modulus of the 3-layered Sample C was measured on a rectangular sample of the 3 layers of size 100×20×10 mm according to ISO178. The imposed speed of testing was 1 mm/min. The result is provided in FIG. 10.

The foamed layer of Sample C gave a tensile modulus of 80 MPa with a coefficient of poisson of 0.3.

The foamed layer of Sample C gave a compression modulus of 43 MPa with a coefficient of Poisson of 0.4.

The compression modulus of Sample C parallel to the layers was 257 MPa and perpendicular to the layers was 16 MPa with a coefficient of Poisson of 0.4.

Further results are presented in Table 2.

TABLE 2

Figure 10:
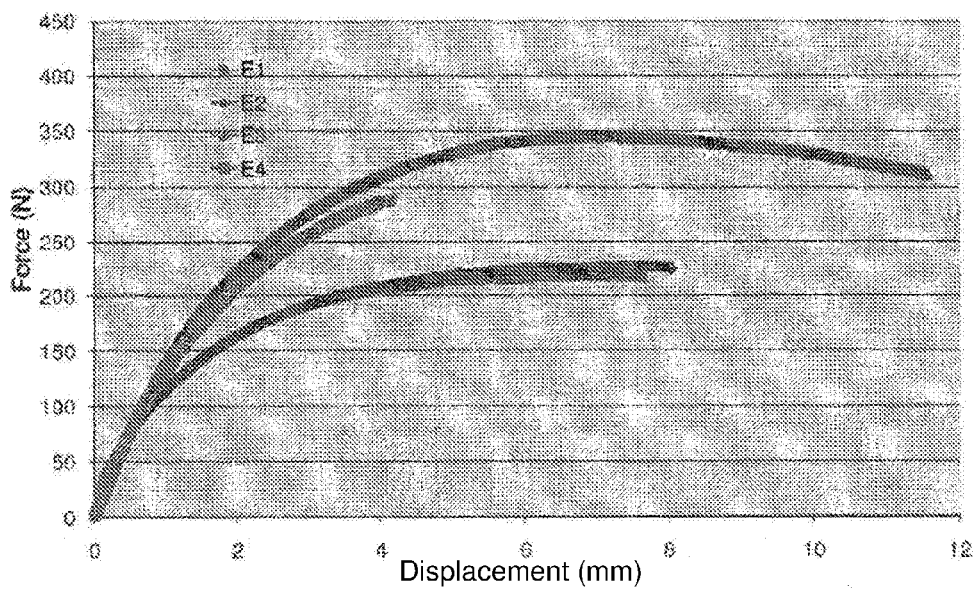
FIG. 10 depicts flexural modulus measured on a rectangular sample of a three layers in accordance with one or more embodiments.

|  | Density or equivalent density (g/cm³) | Tensile (Young's) modulus (MPa) (true linear modulus) | Compression Modulus (true linear modulus - perpendicular to the layers) | Flexural Modulus |
|---|---|---|---|---|
| Sample C | 347 | 264 at $10^{-3}$ $s^{-1}$ 293 at $10^{-3}$ $s^{-2}$ | 16 | See FIG. 10 |
| Sample C - foamed layer alone | 200 | 80 at $10^{-3}$ $s^{-1}$ | 43 | n.a. |
| Sample D | 352 | 255 at $10^{-3}$ $s^{-1}$ 302 at $10^{-3}$ $s^{-2}$ | 31 | n.a. |
| Sample E | n.a | 90 at $10^{-3}$ $s^{-1}$ 102 at $10^{-3}$ $s^{-2}$ | 27 | n.a. |
| PE (very low density) | 900 | 262 (lit. value) | n.a | n.a. |
| PE (low density) | 910 | 345 (lit. value) | n.a | n.a. |
| PE (high density) | 940 | 645 (lit. value) | n.a | n.a. |

(lit. value taken from "Handbook of polyethylene" by Andrew J. Peacock)

Thus, it can be seen that Samples C and D according to the invention, having an overall average density of 347 g/cm³ and 352 g/cm³ respectively, has a tensile modulus comparable to a very low to low density polyethylene of densities between 900-910 g/cm³.

Consequently, this means that even at very low average densities, the 3-layered structures according to the invention show high rigidity and high stiffness. Thus, the invention is particularly suitable for making boats, particularly leisure boats and cars, in particular car bodies. It is noted, that due to increased rigidity and stiffness, boats can attain higher maximum speeds.

Example 6

Increased Heat Deflection Temperature (HDT)

Creep was determined by measuring the HDT according to ISO 75 Method B. M3670® had a higher HDT than a metallocene-produced polyethylene not comprising ionomer and grafted polyolefin e.g. M4041®.

HDT

M4041® of 61° C. at 0.455 MPa (0.66 psi).
M3670® of 65.2° C. at 0.455 MPa (0.66 psi).

Linear low density polyethylene generally have an HDT of 40-80° C., and polyethylene ionomer a lower HDT of 45-52° C. (see "Handbook of polyethylene" by Andrew J. Peacock). Thus, it is all the more surprising that a mixture of metallocene-produced polyethylene, ionomer and grafted polyolefin has a higher HDT. This is representative of the synergetic effect caused by the simultaneous presence of metallocene-produced polethylene, ionomer and grafted polyolefin, and blowing agent leading to increased stiffness and rigidity. This is particularly suitable for articles, such as boats, greater than 3 m in size.

The invention claimed is:

1. A multilayer rotomolded article having reinforced structural properties comprising:
   a polyethylene-produced external skin layer that is prepared from a composition comprising:
      from 70 to 99.9 weight percent of a blend, wherein the blend comprises from 20 to 80 weight percent of a first metallocene-produced polyethylene, and from 20 to 80 weight percent of a second metallocene-produced polyethylene, wherein the first metallocene-produced polyethylene exhibits a density of at least 0.920 g/cc and at most 0.965 g/cc, measured following the method of standard test ASTM D 1505 at 23° C., and wherein the second metallocene-produced polyethylene exhibits a density of at least 0.930 g/cc and at most 0.968 g/cc, measured following the method of standard test ASTM D 1505 at 23° C., characterized in that the second metallocene-produced polyethylene has a higher density than the first metallocene-produced polyethylene; and
      from 0.1 to 30 weight percent of an ionomer, a grafted polyolefin, or mixtures thereof;
   an intermediate foamed metallocene-produced polyethylene layer, wherein the polyethylene resin may be the same as or different from that of the polyethylene-produced external skin layer, wherein the intermediate foamed metallocene-produced polyethylene layer is prepared from a composition comprising a mixture of metallocene-produced polyethylene, an ionomer, a polyolefin grafted with an anhydride, and a chemical blowing agent; and
   an internal skin layer that is a polyethylene-produced layer that comprises 90 to 100 wt % metallocene-produced polyethylene based on a total weight of the internal skin layer.

2. The multilayer rotomolded article of claim 1, wherein the intermediate foamed metallocene-produced polyethylene layer is prepared from:
   a polyethylene composition comprising the mixture of the metallocene-produced polyethylene, the ionomer, and the polyolefin grafted with the anhydride in an amount ranging from 95 to 99.8 wt % based on the total weight of intermediate foamed metallocene-produced polyethylene layer; and
   the chemical blowing agent in an amount ranging from 0.2 to 5 wt % based on the total weight of intermediate foamed metallocene-produced polyethylene layer.

3. The multilayer rotomolded article of claim 1, wherein the external skin layer composition comprises from 2 to 20 wt % of the grafted polyolefin, or the ionomer or mixtures thereof.

4. The multilayer rotomolded article of claim 1, wherein the internal skin layer comprises 100 wt % the metallocene-produced polyethylene.

5. The multilayer rotomolded article of claim 1, wherein the chemical blowing agent is selected from exothermic agents selected from the group consisting of azodicarbonamide (AZ), 4,4'-oxy-bis(benzenesulfonylhydrazide) (OB), and endothermic agents selected from sodium bicarbonate (SB).

6. The multilayer rotomolded article of claim 1, wherein the metallocene-produced polyethylenes are prepared with a bistetrahydroindenyl or a bisindenyl catalyst component.

7. The multilayer rotomolded article of claim 2, wherein the first metallocene-produced polyethylene is present in the blend in amounts ranging from 40 to 60 wt %, wherein the second metallocene-produced polyethylene is present in the blend in amounts ranging from 40 to 60 wt %.

8. The multilayer rotomolded article of claim 1, further comprising wall thicknesses of: from 1 to 50 mm for the external skin layer; from 3 to 200 mm for the intermediate foamed layer; and from 0.5 to 2.5 mm for the internal skin layer.

9. The multilayer rotomolded article of claim 1, further comprising wall thicknesses of: from 1.5 to 3 mm for the external skin layer; from 9 to 15 mm for the intermediate foamed layer; and from 0.5 to 2.5 mm for the internal skin layer.

10. The multilayer rotomolded article of claim 1, wherein the article is selected from the group consisting of boats, leisure boats, cars, car bodies, structural parts, design parts, and tanks.

11. The multilayer rotomolded article of claim 1, wherein the ionomers are zinc or sodium salt of a copolymer derived from ethylene and methacrylic acid, and wherein the polyolefin grafted with anhydride is polyethylene grated with anhydride or polypropylene grafted with anhydride.

12. The multilayer rotomolded article of claim 1, wherein the multilayer rotomolded article is prepared by a rotomolding process characterized in that the composition of the intermediate foamed metallocene-produced polyethylene layer is fed into a rotational mold as soon as or before a melting temperature of the composition of the polyethylene-produced external skin layer is reached, and the composition of the internal skin layer is fed into the rotational mold as soon as or before a melting temperature of the composition of the intermediate foamed metallocene-produced polyethylene layer is reached.

13. The multilayer rotomolded article of claim 1, wherein the article is formed in the absence of a release agent.

14. The multilayer rotomolded article of claim 12, wherein the rotomolding process is characterized in that the composition of the intermediate foamed metallocene-produced polyethylene layer is fed into the rotational mold before the melting temperature of the composition of the polyethylene-produced external skin layer is reached, and the composition of the internal skin layer is fed into the rotational mold before the melting temperature of the composition of the intermediate foamed metallocene-produced polyethylene layer is reached.

15. The multilayer rotomolded article of claim 1, wherein the article exhibits a Young's modulus in excess of 1000 MPa.

16. The multilayer rotomolded article of claim 1, wherein the first metallocene-produced polyethylene exhibits a melt index ranging from at least 0.5 dg/min to at most 25 dg/min, measured following the method of standard test ASTM D 1283 at a temperature of 190° C. and a load of 2.16 kg, wherein the second metallocene-produced polyethylene exhibits a melt index ranging from at least 1 dg/min to at most 30 dg/min, measured following the method of standard test ASTM D 1283 at a temperature of 190° C. and a load of 2.16 kg, characterized in that the melt index of the second metallocene-produced polyethylene is different than the melt index of the first metallocene-produced polyethylene.

17. The multilayer rotomolded article of claim 1, wherein the metallocene-produced polyethylene of the internal skin layer exhibits a melt index ranging from at least 0.5 dg/min to at most 25 dg/min, measured following the method of standard test ASTM D 1283 at a temperature of 190° C. and a load of 2.16 kg.

18. The multilayer rotomolded article of claim 1, wherein the metallocene-produced polyethylene of the internal skin layer exhibits a density of at least 0.920 g/cc and at most 0.965 g/cc, measured following the method of standard test ASTM D 1505 at 23° C.

19. The multilayer rotomolded article of claim 1, wherein the metallocene-produced polyethylene of the internal skin layer has a bimodal or multimodal molecular weight distribution.

20. The multilayer rotomolded article of claim 1, wherein the metallocene-produced polyethylene of the internal skin layer exhibits a polydispersity ranging from 2 to 20.

* * * * *